United States Patent
Orgaz Villegas et al.

(10) Patent No.: US 7,342,765 B2
(45) Date of Patent: Mar. 11, 2008

(54) CURRENT INSULATION DEVICE FOR FUEL SYSTEMS

(75) Inventors: Eduardo Orgaz Villegas, Madrid (ES); Jorge Nogal Martin, Madrid (ES)

(73) Assignee: Airbus Espana, S.L., Madrid (ES)

( * ) Notice: Subject to any disclaimer, the term of this patent is extended or adjusted under 35 U.S.C. 154(b) by 248 days.

(21) Appl. No.: 11/359,774

(22) Filed: Feb. 22, 2006

(65) Prior Publication Data

US 2007/0145190 A1    Jun. 28, 2007

(30) Foreign Application Priority Data

Dec. 23, 2005    (WO) ................ PCT/ES2005/070182

(51) Int. Cl.
*H05F 3/00* (2006.01)

(52) U.S. Cl. ............ 361/218; 361/56; 361/212; 361/216; 361/217; 439/88; 439/181; 439/183; 439/934; 174/2; 174/78; 174/84 R; 244/1 A

(58) Field of Classification Search ........ 361/216–218; 439/88

See application file for complete search history.

(56) References Cited

U.S. PATENT DOCUMENTS

| | | | | | |
|---|---|---|---|---|---|
| 2,393,003 | A | * | 1/1946 | Smith | ............ 604/170.01 |
| 4,008,937 | A | * | 2/1977 | Filippi | ............ 439/192 |
| 4,346,428 | A | * | 8/1982 | Gale | ............ 361/215 |
| 4,891,732 | A | * | 1/1990 | Jones | ............ 361/218 |
| 5,034,157 | A | * | 7/1991 | Merrell et al. | ............ 252/512 |
| 5,959,828 | A | * | 9/1999 | Lewis et al. | ............ 361/215 |
| 5,973,903 | A | * | 10/1999 | Tomerlin | ............ 361/215 |
| 6,740,236 | B2 | * | 5/2004 | Rickle et al. | ............ 210/243 |

* cited by examiner

*Primary Examiner*—Michael Sherry
*Assistant Examiner*—Terrence R. Willoughby
(74) *Attorney, Agent, or Firm*—Ladas & Parry LLP

(57) ABSTRACT

An electrical insulating device for a linear component forming part of a fuel system subjected to risks of possible external electrical discharges formed by a part (13) made of insulating material attached to two metal flanges (15, 17) that allow inserting the device (11) between two parts of said linear component, said part (13) being formed by a cylindrical body (21) with a castellated crown (23) on its outer side, formed by longitudinal (25) and transverse (27) segments, and said metal flanges (15, 17) having transverse projections (31, 33) facing the transverse segments (27) of the castellated crown (23) for facilitating their attachment by suitable means (39).

8 Claims, 1 Drawing Sheet

CURRENT INSULATION DEVICE FOR FUEL SYSTEMS

FIELD OF THE INVENTION

The invention relates to an insulation device inserted in a linear component forming part of a fuel system subjected to risks of possible electrical discharges and, more particularly, to a device for protecting aircraft fuel systems from electrical discharges caused by lightning strikes on fuel tanks manufactured with materials with low electrical conductivity.

BACKGROUND OF THE INVENTION

Composites offer high electrical resistance when compared to metallic materials. The latter have been traditionally used in the aeronautical field for manufacturing structures intended to fuel storage, given the mechanical features these materials have with respect to their weight.

The high electrical resistance inherent to composites causes a highly relevant induction effect on the internal systems of the fuel tank. Said effect induces internal electric currents that may generate failures or phenomena which are catastrophic for overall structural integrity.

The phenomena related with moderate or severe electrical discharges occurring in the case of lightning strikes and which must be prevented in a structure manufactured with a material with low electrical conductivity to assure its structural integrity/malfunction of any of the critical electrical equipment/electric arcs inside the tank are:

Hot spots: the high current density in certain specific locations of the structure such as joints or intersection components, can originate high temperature spots. If this temperature exceeds 200° C. (the autoignition point of fuel considered by the FAA/JAA authorities) the fuel may reach its flash point should the suitable stoichiometric concentrations be present inside the tank.

Electric arcs (sparking): the flow of current through materials with different resistivities and in geometrically separated locations can produce voltage drops between amongst one another, releasing discharges in the form of an electric arc and causing the ignition of the fuel/inflammable liquid or vapours contained within the structure.

Electrical equipment malfunction: electrical discharges caused by the lightning strike give rise to high levels of current circulating through the outer structure and may therefore introduce electric current in the internal systems either by shunting or by induction. These effects are capable of causing critical equipment malfunction, generating catastrophic failures.

Patent application PCT/ES05/070133 by the applicant of the present invention describes a method for protecting the set of metal devices arranged inside an electrical discharge-proof fuel tank, manufactured completely or partially with composites, which considers, amongst other items, including insulating inserts in the linear metal devices such that they are subdivided into parts that are insulated from each other.

The present invention refers to an insert of this type that may be used in places with little space available.

SUMMARY OF THE INVENTION

The present invention proposes an electrical insulation device for a linear component, for example a pipe, which forms part of a fuel system subjected to risks of possible external electrical discharges that is formed by a part made of an insulating material joined to two metal flanges allowing the insertion of the device between two parts of said linear component.

The part made of insulating material is constituted by a cylindrical body with a castellated crown on its outer side, formed by longitudinal (in the same direction as the axis of the cylindrical body) and transverse (in a perpendicular direction to the axis of the cylindrical body) segments.

For its part, the flanges include transverse projections facing the transverse segments of the castellated crown to allow their attachment by suitable means.

The device object of the present invention may be applied to fuel and ventilation lines forming part of the fuel systems installed in aircraft, when it is necessary to stop the current or rather insulate sections of the installation in which the passage thereof is intended, and the space available is small.

Other features and advantages of the present invention will be gathered from the following detailed description of an illustrative embodiment of its object with respect to the attached figures.

DETAILED DESCRIPTION OF THE INVENTION

Figure 1:
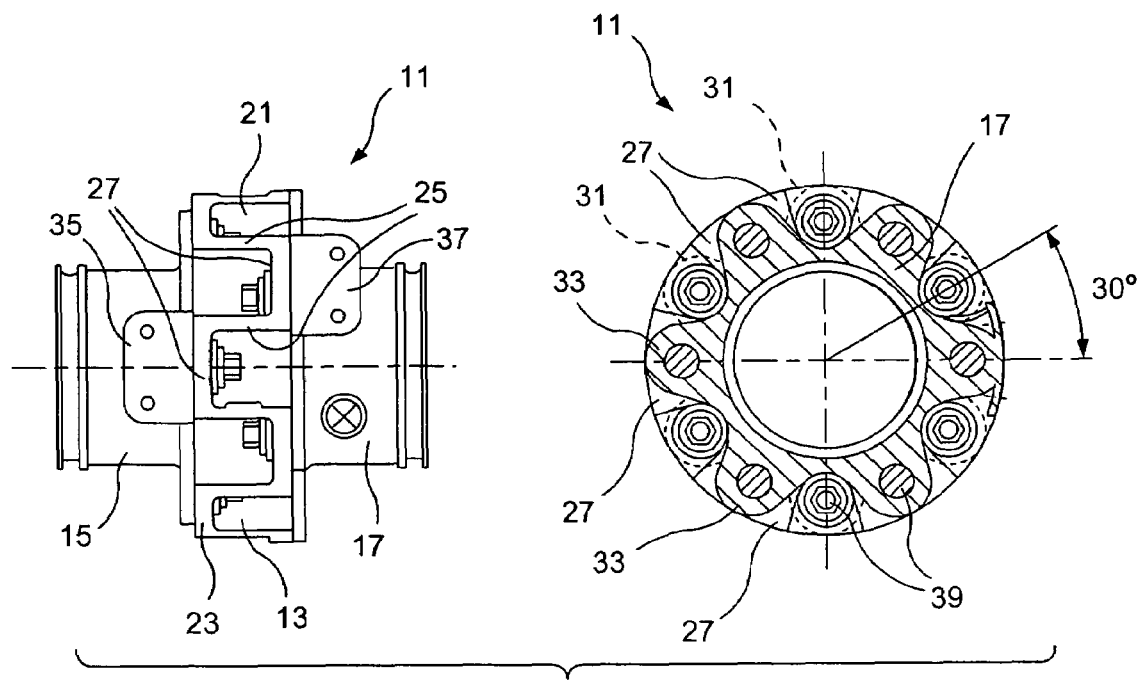
FIG. 1 shows side elevational and front sectional views of the electrical insulation device according to the present invention.
Figure 2:
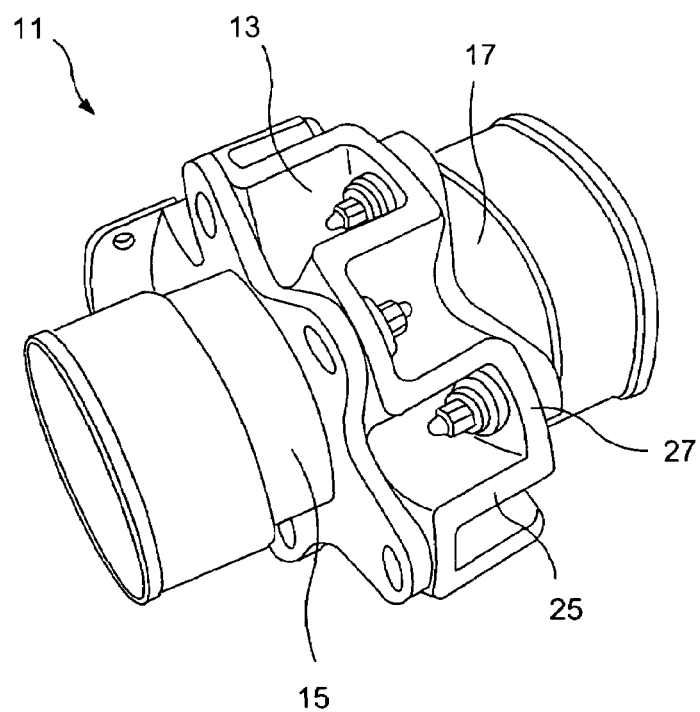
FIG. 2 shows a perspective view of the electrical insulation device according to the invention.

Following FIGS. 1 and 2 it is observed that device 11 is formed by a part 13 made of insulating material attached to two metal flanges 15, 17 for facilitating insertion of the device between two parts of the linear component (for example, a pipe) to be insulated.

The insulating part 13 is formed by a cylindrical body 21 with a castellated crown 23 on its outer side, formed by longitudinal 25 and transverse 27 segments.

The flanges 15, 17 have, respectively, transverse projections 31, 33 facing the transverse segments 27 of the castellated crown 23 in order to facilitate their attachment by suitable means, such as screws 39.

The insulating part 13 can be made by machining or by injection moulding an insulating material (nylon, polyamide) with the mentioned castellated shape which prevents the passage of current when it is circulating along the fuel or ventilation lines in which the device is inserted and allows providing efficient insulating devices when there are space limitations in the fuel system installation.

From the technical point of view, said part 13 undergoes various insulation tests during which it is subjected to a potential difference between the ends thereof at 500 VDC and at 1000 VDC, providing electrical insulation in the order of 100 Mega ohms as a minimum requirement.

In a preferred embodiment, the length of the insulating part 13 is comprised between 25-80 mm which allows complying with its electrical insulation function without becoming statically charged.

The device 11 according to the invention is applicable, as has been mentioned above, to fuel installations in which the current is intended to be insulated in sections or when a single bonding point philosophy is intended to be applied.

As long as the requirements of the material to be used (nylon, polyamide), the minimum resistance of 100 Mega ohms and the reduced dimensions due to the reasons set forth are compulsorily complied with, the device object of the present invention is also applicable to other systems other than fuel, such as for example the hydraulic or pneumatic circuit, with the only variation as regards the diameter of the pipe that must be insulated.

It is important to consider that since there is less amount of insulating material than in tubular-shaped insulating devices, the material must comply with the minimum resistance required, thus increasing the thickness of the part in comparison with other configurations.

In the case of fuel systems, the metal flanges 15, 17 must carry some components 35, 37 for installing a bonding point, since these systems require a double electrical bonding.

The preferred embodiment just described may incorporate those modifications comprised within the scope defined by the following claims.

The invention claimed is:

1. An electrical insulation device (11) for a linear component forming part of a fuel system subjected to risks of possible external electrical discharges, characterised in that it is formed by a part (13) made of insulating material attached to two metal flanges (15, 17) that allow inserting the device (11) between two parts of said linear component, said part (13) being formed by a cylindrical body (21) with a castellated crown (23) on its outer side, formed by longitudinal (25) and transverse (27) segments, and said metal flanges (15, 17) having transverse projections (31, 33) facing the transverse segments (27) of the castellated crown (23) for facilitating their attachment by suitable means (39).

2. An electrical insulating device (11) for a linear component forming part of a fuel system subjected to risks of possible external electrical discharges according to claim 1, characterised in that said flanges (15, 17) also include a component (35, 37) for installing a bonding point.

3. An electrical insulating device (11) for a linear component forming part of a fuel system subjected to risks of possible external electrical discharges according to claim 1, characterised in that the length of the insulating part (13) is comprised between 25 and 80 mm.

4. An electrical insulating device (11) for a linear component forming part of a fuel system subjected to risks of possible external electrical discharges according to claim 1, characterised in that the fuel system belongs to an aircraft.

5. An electrical insulating device (11) for a linear component forming part of a fuel system subjected to risks of possible external electrical discharges according to claim 2, characterised in that the length of the insulating part (13) is comprised between 25 and 80 mm.

6. An electrical insulating device (11) for a linear component forming part of a fuel system subjected to risks of possible external electrical discharges according to claim 2, characterised in that the fuel system belongs to an aircraft.

7. An electrical insulating device (11) for a linear component forming part of a fuel system subjected to risks of possible external electrical discharges according to claim 3, characterised in that the fuel system belongs to an aircraft.

8. An electrical insulating device (11) for a linear component forming part of a fuel system subjected to risks of possible external electrical discharges according to claim 5, characterised in that the fuel system belongs to an aircraft.

* * * * *